(12) United States Patent
Sartori et al.

(10) Patent No.: US 6,911,642 B2
(45) Date of Patent: Jun. 28, 2005

(54) OBJECT PRESENCE DETECTION METHOD AND DEVICE

(75) Inventors: Alvise Sartori, Povo (ES); Giampietro Tecchiolli, Trento (ES); Bruno Crespi, Lavarone (ES); Jose Maria Tarrago Pujol, Bellaterra (ES); Francesc Daura Luna, Sant Quirze del Valles (ES); Daniel Bande Martinez, Vilanova i la Geltru (ES)

(73) Assignee: Ficosa North America Corporation, Madison Heights, MI (US)

( * ) Notice: Subject to any disclaimer, the term of this patent is extended or adjusted under 35 U.S.C. 154(b) by 337 days.

(21) Appl. No.: 10/203,503

(22) PCT Filed: Feb. 16, 2001

(86) PCT No.: PCT/ES01/00057

§ 371 (c)(1),
(2), (4) Date: Dec. 17, 2002

(87) PCT Pub. No.: WO01/61371

PCT Pub. Date: Aug. 23, 2001

(65) Prior Publication Data

US 2003/0141762 A1 Jul. 31, 2003

(30) Foreign Application Priority Data

Feb. 18, 2000 (ES) .......................................... 200000378

(51) Int. Cl.$^7$ ................................................ G08G 1/00
(52) U.S. Cl. .................... 250/208.2; 250/221; 340/435; 340/903
(58) Field of Search .............................. 250/208.1, 221, 250/222.1; 340/435, 436, 901–904, 555–557; 367/93, 909

(56) References Cited

U.S. PATENT DOCUMENTS

| 4,694,295 A | * | 9/1987 | Miller et al. ................. 340/903 |
| 5,424,952 A | | 6/1995 | Asayama |
| 5,521,633 A | | 5/1996 | Nakajima et al. |
| 5,625,210 A | | 4/1997 | Lee et al. |
| 5,642,299 A | | 6/1997 | Hardin et al. |
| 5,699,057 A | | 12/1997 | Ikeda et al. |
| 2002/0005778 A1 | * | 1/2002 | Breed et al. ................. 340/435 |

FOREIGN PATENT DOCUMENTS

| EP | 0442312 | 8/1991 |
| EP | 0543537 | 5/1993 |
| EP | 0591743 | 4/1994 |

OTHER PUBLICATIONS

International Search Report dated May 21, 2001 for PCT/ES01/00057 (4pgs.).

* cited by examiner

Primary Examiner—Stephone B. Allen
(74) Attorney, Agent, or Firm—Jones Day

(57) ABSTRACT

An object presence detection device, of the type mounted to a motor vehicle having at least one blind spot, where the detection device is for detecting an object situated in the blind spot, comprises: a receiver for detecting electromagnetic waves, comprising a focussing device, and a light detector converting said received electromagnetic waves into electrical signals; an electronic circuit converting the electrical signals into digitized signals; a logic circuit analyzing the digitized signals to analyze the presence of objects in the blind spot which are moving relative to the vehicle, and emitting variable output signals depending on the result of the analysis; indicator members activated by the output signals, suitable to be perceived by the driver.

29 Claims, 6 Drawing Sheets

OBJECT PRESENCE DETECTION METHOD AND DEVICE

FIELD OF THE INVENTION

The invention relates to an object presence detection method and to a device to put said method into practice, the device being of the type mounted to a motor vehicle having at least one blind spot, where the detection device is for detecting an object situated in the blind spot.

BACKGROUND OF THE INVENTION

Conventional motor vehicles are usually provided with rear view mirrors, generally one internal mirror and one or two external mirrors, which allow the user or driver to see behind without the user having to turn his or her head around. Nevertheless, in spite of having a plurality of mirrors there are usually areas, known as blind spots, which are not covered by said mirrors.

There is known the use of systems, which capture an image oriented towards a blind spot by means of a CCD camera and show it to the user on a screen located in the vehicle passenger compartment. These systems make it possible for the user to see in the blind spots without having to move himself, nevertheless, they have a number of drawbacks: they require image transmission systems having a sufficient quality for the user to perceive a clear picture, which requires working with a high number of pixels, there must be space in the passenger compartment to be able to accommodate the corresponding screen, the system does not process the image but only transmit it, etc. They are, therefore, expensive systems, which do not cooperate actively in the detection of situations of risk.

SUMMARY AND OBJECTS OF THE INVENTION

It is an object of the invention to overcome some drawbacks and limitations of the mentioned prior art. This object is achieved by an object presence detection device of the type first mentioned above, which comprises: (a) a receiver for detecting electromagnetic waves, comprising a focussing device, and a light detector converting the received electromagnetic waves into electrical signals, where the light detector defines an image surface, (b) an electronic circuit converting the electrical signals into digitized signals, (c) a logic circuit analyzing the digitized signals to analyze the presence in the blind spot of objects which are moving relative to the vehicle, and generating variable output signals depending on the result of the analysis, (d) indicator members, activated by the output signals, suitable to be perceived by the driver, the passenger or, in general, by any passenger of the vehicle.

In fact, a detection device of this type captures the blind spot image and analyzes it, informing the driver of the result of the analysis. This affords a number of advantages: the driver is now shown the blind spot image, whereby it is not necessary to have space in the compartment for a screen, the driver is additionally provided with information of "greater value" in the sense that the detection device has already effected an analysis and the driver or user is provided with the result of the analysis. Furthermore, the detection device requires receivers with a smaller number of pixels than required to provide the driver with an image of the blind spot having a minimum quality, whereby the detection device may be equipped with cheaper receivers without any loss of performance.

The detection device not only analyses the presence of an object in the blind spot, but also provides a qualitative idea of the speed of the object relative to the vehicle and, therefore, determines whether the object is approaching or receding, with an approximate idea of the speed. This allows fuller information to be provided to the driver, since he may distinguish different levels of risk depending on the relative speed of the object.

The detection device also provides a qualitative idea of the distance of the object relative to the vehicle and, therefore, determines the position of the object relative to the vehicle. This allows fuller information to be provided to the driver, since he may distinguish different levels of risk depending on the position of the object.

The light detector is preferably a set of sensor elements, which are advantageously photodiodes, distributed according to a flat two-dimensional matrix defining mutually parallel rows. In this way, the sensor element matrix defines the image surface, which is formed by a plurality of pixels, where one sensor element corresponds to each pixel.

The photodiodes convert the electromagnetic waves into an electrical current. This electrical current is preferably converted to an electrical voltage and is amplified.

The light detector is preferably formed by active sensor elements having a dynamic range of not less than six decades ($10^6$=120 dB) on one same image surface, i.e., between the minimum detection threshold value and the saturation threshold there is a range of six decades, with the light intensity being expressed in lux. Likewise, a pixel which are any one time is receiving the minimum detection value, may detect in the following image acquisition a value six decades greater, and vice versa. This allows the receiver to operate in a variety of light conditions, and even under adverse light conditions, with powerful light contrasts, such as when driving at night. It is for the same reason preferable that one same sensor element should have a dynamic range equal to or greater than six decades between two consecutive images.

The electronic circuit is preferably capable of selecting each of said sensor elements by activating the corresponding row and the corresponding position in said row, it thus being possible to select any sensor element subsequent to any sensor element. In this way, the electrical signal from each of the sensor elements may be taken and all the pixels forming the image surface may be sequentially amplified and digitized. Alternatively, it is also possible for the electronic circuit to simultaneously convert all the electrical signals from a row of sensor elements to digitized signals. Thus, in each particular design, the higher cost of this solution relative to the greater speed of digitization of the image must be evaluated.

As stated above, one of the objects of this invention is to be able to use receivers fitted with low-cost light sensors. It is, in this sense, preferable that the sensor element matrix should have 512×512 sensor elements at the most, and it is most preferred that the maximum number be 320×256 sensor elements. In general, these values relate to the number of active sensors for processing the image. In other words, the sensor element matrix may have more sensor elements, but which are not activated for image processing.

Once the image has been digitized the logic circuit analyzes the image surface. To this end, there is carried out a mathematical convolution preferably, particularly a convolution kernel appropriate for a detection of movement, along the entire image surface of the digitized signal or along a portion thereof.

The logic circuit preferably comprises a specialized electronic circuit that includes: [a] a Von Neumann type sequential central processing unit (CPU), [b] a parallel coprocessor, specialized in the calculation of the convolution over the entire image surface, and which includes at least 32 parallel accumulator multipliers with a high calculation speed for calculating the convolution directly on the image surface at such a calculation speed that the convolution is completed before a new image acquisition is initiated, and [c] a local RAM. In particular it is preferable that the calculation speed is such that it allows a convolution to be calculated in a time of less than 100 ms.

Preferably the detection device is adapted to distinguish a vehicle from other objects. This is achieved, for example, by recognizing edges or arrises, forming rectangles with said edges and comparing said rectangles with a set of patterns. When it has detected a vehicle, it analyzes the relative speed between the detected vehicle and the vehicle fitted with the detection device from the following image.

A preferred embodiment of the invention contemplates dividing the image surface into at least two portions, and using different analysis techniques on each of said portions. Thus, in one of said portions the technique is the one already indicated in the foregoing paragraph, that is to say, in the recognition of the edges, the formation of rectangles, the comparison of the rectangles with a set of patterns and the comparison of two consecutive images to calculate the relative speed, while in another portion a technique is used based on a phase difference to obtain an estimate of the optical flow in a particular direction, to be precise in the direction of the street or road on which the vehicle is moving.

Another analysis technique consists of detecting vertical and/or horizontal arrises clearly marked on the image of the road. Advantageously this technique also includes the follow-up, through successive images, of the movement of said arrises, and the calculation, from said follow-up, of the relative speed of the object (vehicle) detected to the vehicle fitted with the detection device. This technique is described later on in greater detail.

It is also possible that more than one analysis technique may be used simultaneously in one or more of the portions into which the image surface has been divided.

In general, the detection device should give a warning signal on detecting a situation in which there is a collision risk. This signal should serve to give the driver time to avoid or correct a dangerous maneuver. In this sense it is evident that the warning signal should be activated sufficiently in advance for the driver to be able to react appropriately. On considering a situation in which a vehicle enters a motorway, which represents an extreme situation regarding the relative speed between the incoming vehicle and the vehicles driving on the motorway, it will be understood that the detection device should have a wide action radius, to be able to warn the driver sufficiently in advance. Thus, it is preferable that the radius of action of the detection device be greater than 15 m, or better still, greater than 20 m. In this sense, the detection device covers a wider field of vision than strictly the blind spot. Thus, the detection device can detect situations of risk and alert the driver even when the situation of risk was detectable through the rear-view mirror. Thus the cooperation of the detection device in safe driving of the vehicle is much more extensive.

The focussing device can comprise any usual optical element, which is obvious to one of ordinary skill in the art. In particular, it can have a lens or a microlens integrated in the integrated circuit including the focussing device. It is also possible to include an electromagnetic wave transmission guide. This would allow, for example, the whole detection device to be placed at any place inside the vehicle, and to be connected to the outside through said guide. However, the small dimensions of the detections device allow it to be placed inside a rear-view mirror, which is a preferred embodiment, or it is even possible to place a detection device in each of the external rear-view mirrors of a vehicle.

To achieve small sizes, at the same time as low consumption rates and a simplification in the communications between the different components of the detection device, it is advisable that the electronic circuit and the light detector are of CMOS, DMOS, MOS, Si-Ge, BiCMOS technology or SOI (silicon on insulator) technology, and that the light detector and the electronic circuit are physically connected in a multi-chip module (MCM) on a plastics material, fiber glass (FR4), ceramic or silicon substrate.

Optionally the capacity of the detection device to analyze the situations of risk may be improved if, to the characteristics of detection of an approaching object, there is added the capacity detecting whether the vehicle on which the detection device is mounted has initiated actions indicative of an approach to the object. In particular, it is advantageous that the detection device be able to detect the actuation of an indicator and/or be able to detect a turn of the vehicle steering wheel.

If is also of interest that the detection device should be able to communicate various signals to the user or driver of the vehicle allowing the warning signal to be graduated depending on the collision risk. It is thus preferred that the indicative elements include luminous signals having at least two colors, where each color indicates a different warning level. It is also advantageous to include an output element allowing the pictograms to be shown, where said output element is a matrix of LED's or a graphic screen.

A situation of risk may also occur if a passenger of the vehicle fitted with the detection device opens a door without checking whether another vehicle is approaching from behind. It is, therefore, advantageous that the detection device also indicates said situations of risk to the vehicle's passengers.

It is advantageous to allow the detection device to act on the door locks. Thus, for example, it can block a door if it detects a situation of risk.

Finally it is advantageous to add to the object presence detection device a device for detecting drowsiness of the driver. Preferably the drowsiness detection device shares most of the physical devices with the object presence detection device and emits an alarm signal depending on the relative position of the vehicle fitted with the detection device to the lines marking the lanes on the road surface.

Further advantages and features of the invention will be appreciated from the following description wherein, without any limiting nature, there is described one preferred embodiment of the invention, with reference to the accompanying drawings.

BRIEF DESCRIPTION OF THE DRAWINGS

DESCRIPTION OF THE PREFERRED EMBODIMENTS by way of example, FIGS. 1A to 1D schematically illustrate the areas visible through the left side (driver's side) rear-view mirror 1, the areas visible as a result of the driver's lateral peripheral vision 3, and the blind spots 5. The areas visible through the rear-view mirrors 1 must comply with a number of legal requirements, for example those defined in E.C. Directive 71/127 and in the following directives. In particular, as shown in FIG. 1A, the angle of vision should be such that at a distance of 10 m from the rear-view mirror, the width of the area seen should be at least 2.5 m. In FIG. 1A there is to be seen a hatched rectangular area corresponding to the legal requirement, and a triangular area corresponding to what is really seen through a conventional rear-view mirror satisfying the legal requirement.

It is precisely these blind spots 5 that the detection device of the present invention is intended to cover. The detection device should, furthermore, partially overlap with the area seen in the rear-view mirror, in order to avoid discontinuities between what the sensor detects and what the driver sees. For this same reason it is desirable that the sensor should also cover part of the area seen directly by the driver. In this sense, one possible solution consists of using a detection device that covers an area such as the shaded one in FIG. 1C: a right angle triangular shaped area the sides of which are both 4.5 m followed by a rectangular area 4.5 m wide. The total length of the covered area may be made to depend on the capabilities of the detection device. By way of example, FIG. 1C shows a range of 20 m, although the detection device described hereinafter has a range of more than 20 m.

FIG. 1D is a combined illustration of all the previous area together. It will be seen that the blind spot is practically entirely covered, as far as the area corresponding to the adjacent lane is concerned. There is also an overlap with the areas seen directly or through the rear-view mirror.

Figure 1A:
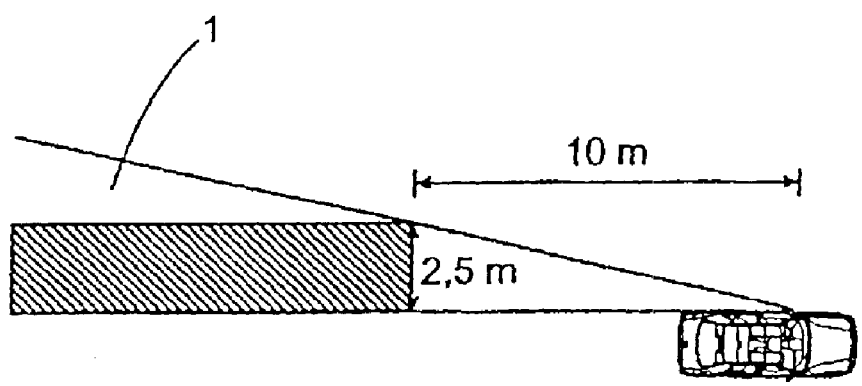
FIGS. 1A–1D show an outline of the blind spots of a vehicle, the areas of direct vision and through the left rear-view mirror, and the area covered by a detection device according to the invention.
Figure 1B:
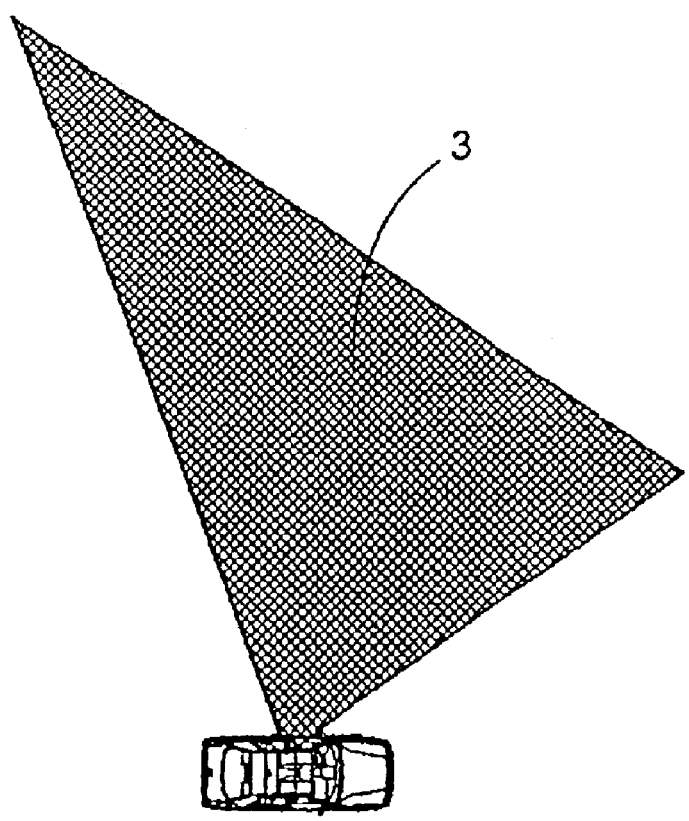
Figure 1C:
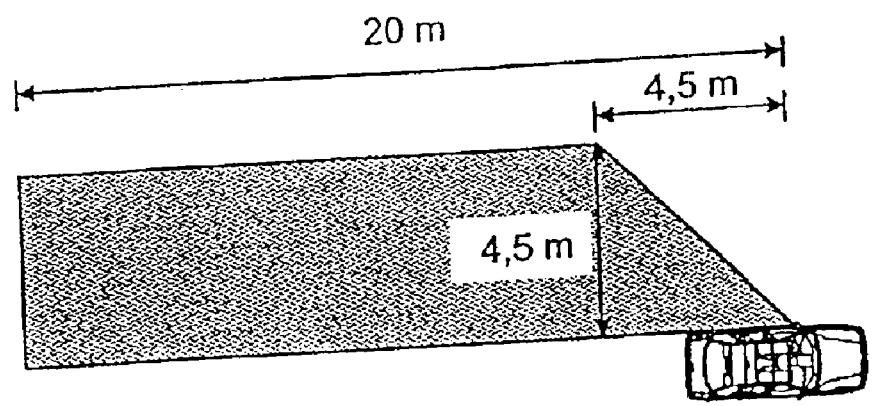
Figure 1D:
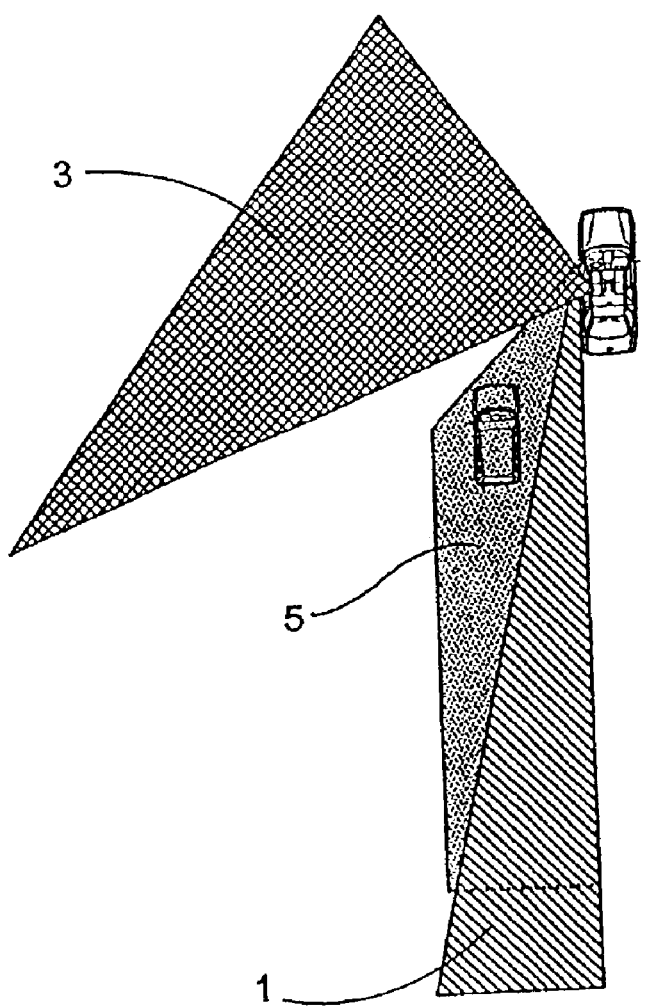
Figure 2:
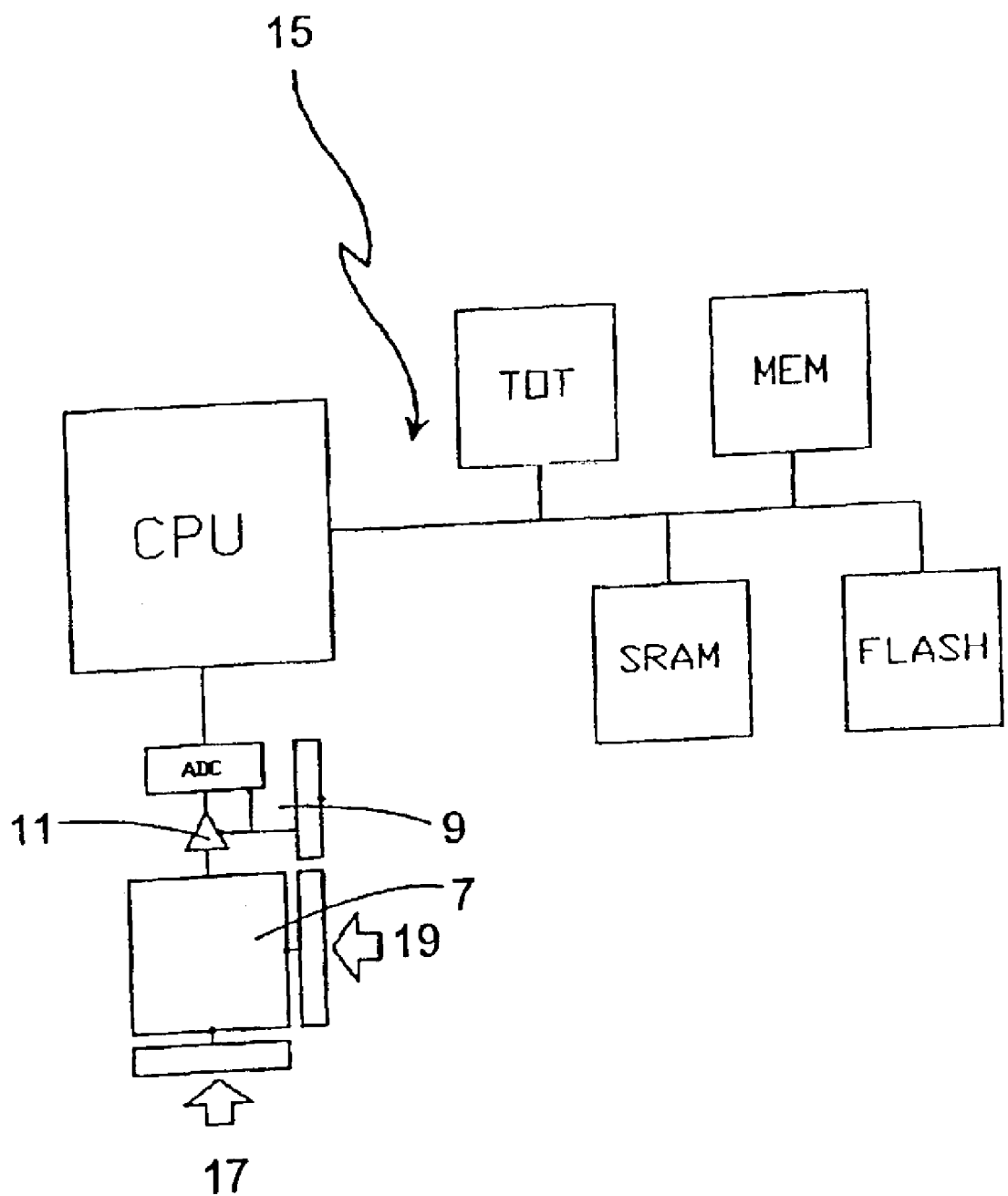
FIG. 2 is a simplified diagram of a detection device according to the invention.

The detection device of the invention shown in FIGS. 2 to 5 comprises a receiver 7 that it is formed by a matrix of 256 rows of photodiodes, with 320 photodiodes in each row. The receiver 7 receives the electromagnetic waves coming from the exterior, in this particular case inside the range of the visible light, suitably focused thanks to a lens. When the light impacts of the photodiodes, these generate an electrical current, the intensity of which depends on the intensity of the light received. This electrical current is converted into a voltage. By selecting a row and a position inside the row, it is possible to select a photodiode, which thus transmits the electrical signal to an electronic circuit 9. The electronic circuit 9 is provided with an amplifier stage 11, and an analog-digital conversion unit ADC, which outputs a digitized signal.

The digital signal is fed into a logic circuit 15. The logic circuit 15 comprises a Von Neumann type sequential central processing unit CPU, a parallel coprocessor TOT that calculates the convolution and is based on an auxiliary memory MEM, a FLASH memory and rapid access static RAM (SRAM). The central processing unit CPU also controls the receiver 7, sending the row selection signals 17 and position inside the row signals 19 to the corresponding registers, and to the electronic circuit 9.

The receiver 7 picks up an image, including the blind spot that is projected on the image surface formed by the photodiodes. It is this image surface which is transmitted to the logic circuit 15 in form of a number of digitized pixels. The receiver 7 is orientated in such a way that the side edge of the image surface is practically flush with the side surface of the motor vehicle 21 and the upper edge of the image surface is flush with the horizon 23. The logic circuit 15 determines the direction of movement along the street or road, which allows it to determine whether a detected movement is in the direction of the road or if it is in another direction, for example vertical. Thus it can filter "noises", such as may be rain, snow, vehicles moving in the opposite direction, etc.

Figure 3:
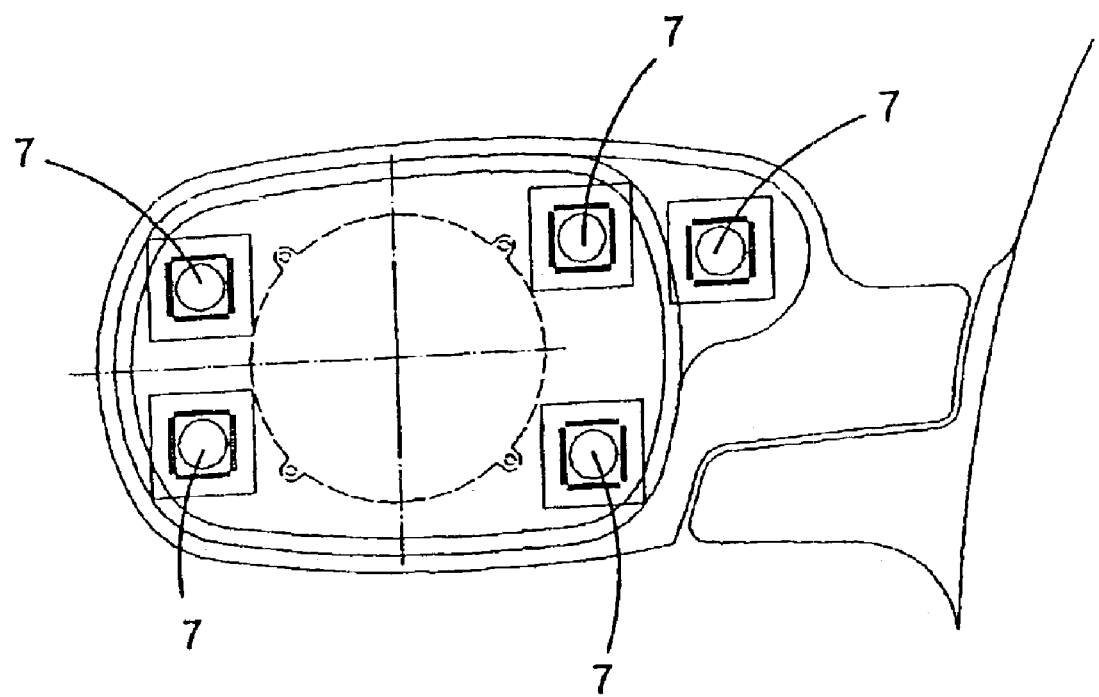
FIG. 3 is a front elevation view of a rear-view mirror showing five possible locations of the receiver.
Figure 4:
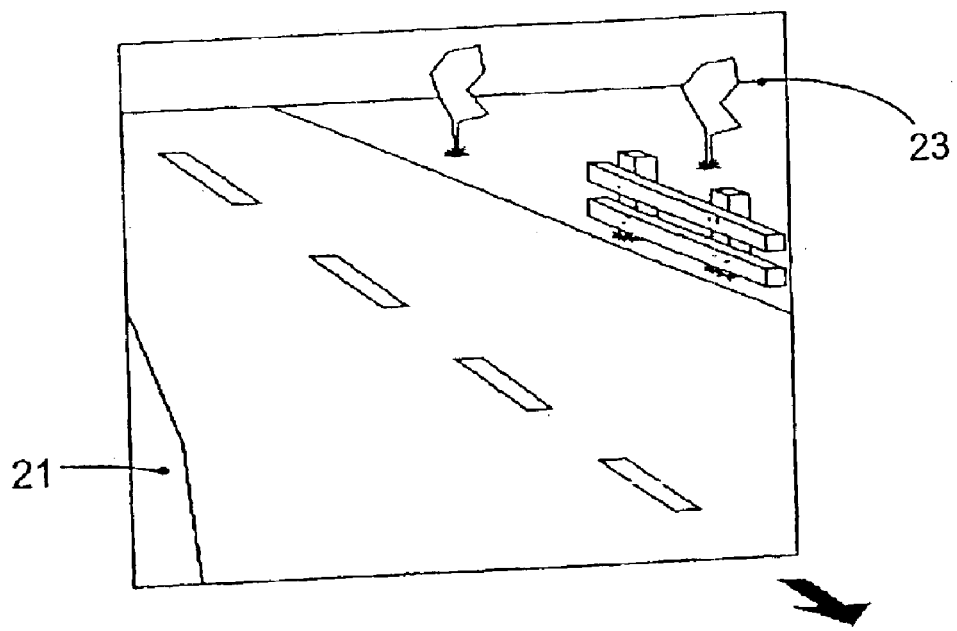
FIG. 4 is a diagram of an image surface.

FIG. 3 shows some examples of positioning of the receiver 7 or, in the case may be, of the end of the electromagnetic wave guide, in an external rear-view mirror.

Figure 5:
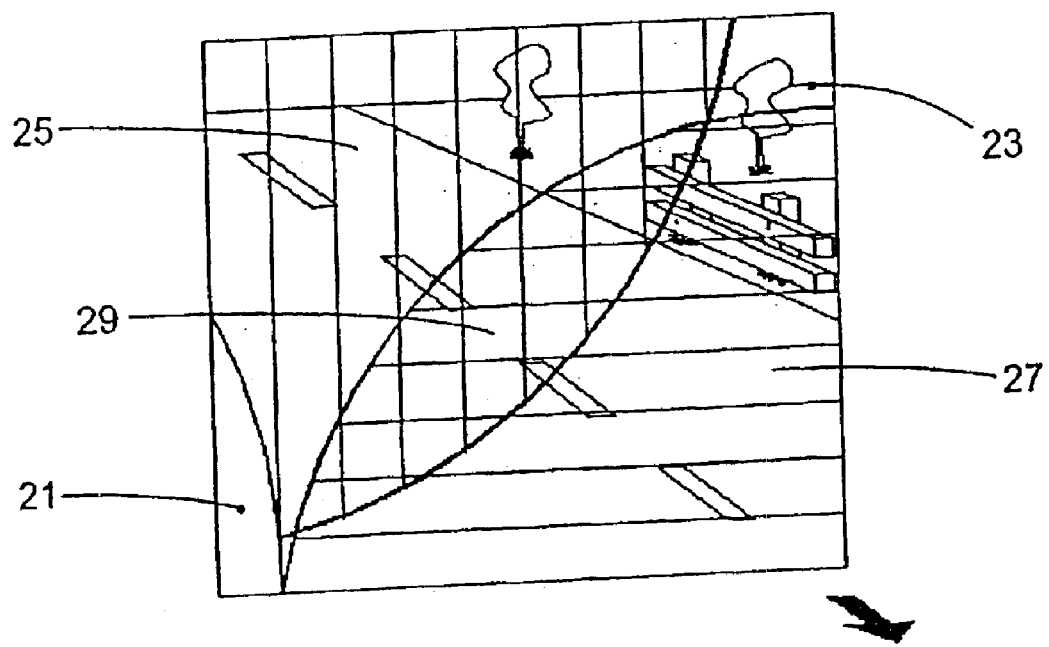
FIG. 5 shows the image surface of FIG. 4, divided into three portions.

As has already been indicated previously, various image analysis algorithms may be affected. In one case the image surface is divided in two portions 25, 27 having an overlap area 29, as shown in FIG. 5. The logic circuit 15 has two independent algorithms: a vehicle detecting algorithm that is applied in portion 25, and a movement detecting algorithm that is applied in portion 27. Both algorithms are applied in the overlap area 29. The vehicle detecting algorithm recognizes the edges of figures existing on the image surface, selects the horizontally and vertically disposed edges and is compared with certain patterns to determine whether there is an object having a shape similar to that of a vehicle. In the affirmative, the next image obtained by the receiver 7 is analyzed, which allows the direction of the movement, as well as the speed of the object, to be determined. The movement-detecting algorithm is based on a phase difference technique to obtain an estimate of the optical flow in the direction of the road. The result is compared with the results obtained in previous images, to eliminate errors and noises by means of a consistency check.

Another possible image analysis algorithm is based on the following. As already said above, the device is designed to detect vehicles overtaking the vehicle fitted with the device by means of the series of images captured with a digital camera, for example a CMOS camera, mounted in the rear-view mirror of a vehicle.

The presence of an approaching vehicle is based on the detection and follow-up of objects moving along the axis of the road (in general any public way) and drawing closer to the vehicle fitted with the device. Starting from an image, the presence of a vehicle may be appreciated by the presence of arrises (or edges) clearly marked in the vertical and horizontal directions on the road surface. In successive images these visual elements (the vertical and horizontal arrises) move forwardly if they are part of an approaching vehicle. On the contrary, they move backwards if they are part of static objects (such as elements of the highway, protective barriers, trees, traffic signals, milestones, etc.) or if they belong to vehicles moving the opposite direction to the vehicle fitted with the device. Therefore a coherent forward movement is interpreted as an overtaking vehicle.

This interpretation is generally correct on motorways or similar roads, where the lanes are clearly defined and the curves usually have a large radius. In these cases the image is a simple perspective view and the overtaking lane can be isolated in a simple way from the rest of the scene using an appropriate mask. Therefore, a forward movement in the overtaking lane is a clear indication of an approaching vehicle. Noises and interference due to holes in the road or abrupt movements of the vehicle fitted with the device can be eliminated by requiring that the forward movement be coherent through various successive images.

The visual image on a road that is not a motorway or the like is much more complex. In particular, the turns to the left of the vehicle fitted with the device can generate a consistent apparent movement, which may generate false alarms. This is particularly frequent in urban environments, where the visual scene contains a large number of objects (parked cars, buildings, diverse traffic signs, etc.) having marked arrises. Furthermore the true distance between the approaching vehicle and the vehicle fitted with the device cannot be correctly estimated from its position, since the lanes are not clearly defined. For this reason it is desirable that the detecting device should have a specific operation module for when the device-carrying vehicle is turning to the left. Thus, during a turn to the left, the detection field moves to a position closer to the vehicle fitted with the device and more restrictive requirements are imposed before activating the alarm signal. As consequence the alarm signal will be activated when the approaching vehicle is closer to the vehicle fitted with the device. However this is not a problem because around tight curves the vehicle speeds are slower than on motorways or other fast roads. Furthermore, in view of the configuration of the street and the frequent presence of intersections, a long detection range is not necessary in the case of an urban environment.

As a particular example the camera may be provided with a sensor that is a 320×256 CMOS matrix with a high dynamic range (120 dB). The size of the processed images is at least 128×128 pixels. The field of vision of the camera is approximately 55°. The camera is positioned in such a way that:

the left vertical edge of the image is close to the side edge of the vehicle fitted with the device.

the upper edge of the image is slightly above the horizon line, by approximately one eighth of the image.

the camera is slightly tilted in the clockwise direction so that it aligns the image along the axis of the highway.

A mask is used that is controlled from the software that defines the region of interest of the images. The mask is positioned in such a way that a car located in the overtaking lane of a straight road and at a great distance is positioned in the left upper end of the mask. The position of the mask in the image can be adjusted to get a fine adjustment of the field of vision.

So that the detection device may work appropriately the image capture speed should preferably be in excess of 40 images per second, since in this way the device is capable of following the trajectory of the approaching vehicles with greater accuracy. The detection device algorithm has four main modules basically:

An optical flow detection module. The algorithm uses a technique based on phase differences to produce a dense estimate of the optical flow in the direction of the axis of the road. To this end a pair of successive images is processed. Visual elements that are not moving forward are filtered and eliminated. The resulting images are fed to the following modules. This module is optional and may be not used.

Vehicle detection and follow-up module. In the region defined by the mask the algorithm calculates the arrises of the image and their directions. The vertical arrises and the horizontal arrises are normalized and integrated along the vertical and horizontal axes respectively. The normalization factor is adjusted dynamically based on the average density of the arrise. The unidirectional projection of said arrises on the corresponding coordinates axis is used to trace the trajectory according to said axis. Approaching objects generate projections with positive speeds, that is to say to the right and downwardly of the image. These points are separated from other points that are stationary or have relative movements with the aid of directional filters. The resulting trajectories are identified and selected.

Module for detection of vehicles without relative speed. Once the trajectory of an approaching vehicle has been identified (by means of the displacement of its corresponding unidirectional projections) the speed of the vehicle is estimated and supervised. Therefore it is possible to detect situations in which this approaching vehicle reduces speed and circulates at the same speed as the vehicle fitted with the device, staying at a short distance from the vehicle fitted with the device. In these cases it is possible to emit a specific type of alarm signal until substantial changes (dropping behind or overtaking the vehicle fitted with the detection device) are observed in the environment of the image of the approaching vehicle. In other words, this module allows for control of traffic situations (for example dense traffic) where parallel circulation takes place, namely, vehicles circulating in different lanes at practically the same speed. In these cases it is relatively frequent for a vehicle to be positioned in the blind spot of another vehicle, which may generate situations of danger.

Left turn detection module. During left turns, there occurs a constant overall displacement of the visual elements contained in different images. The constant displacements are detected in the upper portion of successive images by means of a correlations technique. The coherence of this signal during a number of successive images is used as an indication that the vehicle fitted with the device is turning and, therefore, that the left turn detection module should be activated.

Figure 6:
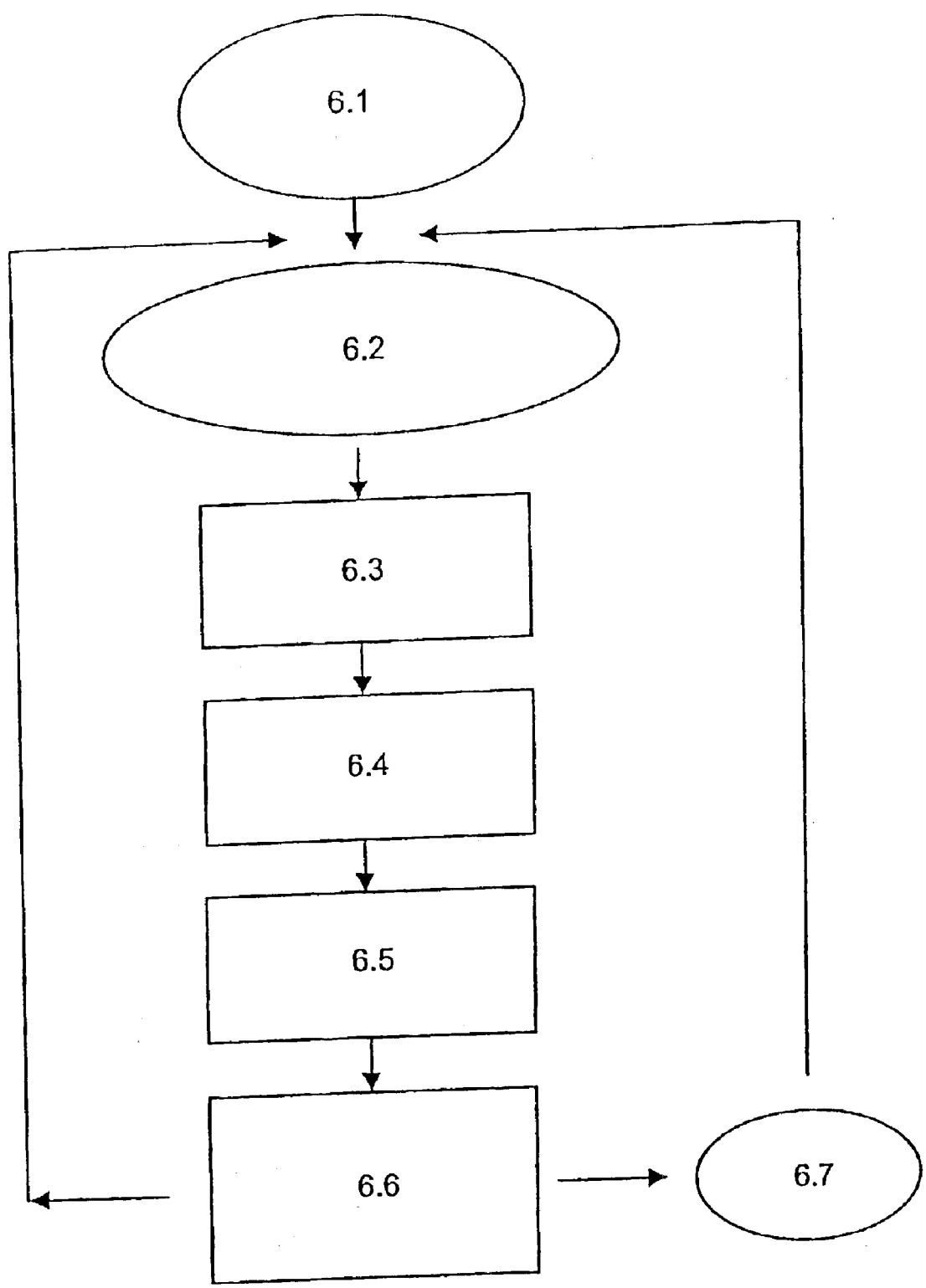
FIG. 6 is a block diagram of an algorithm according to the invention.

FIG. 6 shows a block diagram in which the states of the algorithm are illustrated. The reference numbers given represent the following blocks:

6.1 Initialization of the algorithm
6.2 Image acquisition
6.3 Optical flow estimate
6.4 Left turn detecting
6.5 Vehicle detection and follow-up
6.6 Consistent forward movement?
6.7 Activate alarm First of all, the optical flow module 6.3 carries out a coarse filtering of the image flow, basing itself on the direction of the movement. Then, the left turn module 6.4 wars the system whether the vehicle fitted with the device is turning. Next the detection and follow-up system 6.5 follows the trajectories of the moving objects and activates, if required, the corresponding alarm signal. Next, if the alarm is activated, the zero speed module is activated.

Two modes of operation may be established. If the vehicle fitted with the device is not turning, only the projections of the trajectories along the horizontal axis are considered. If the follow-up module detects a trajectory longer than 15 images, an alarm signal is generated and it gives an estimate of the relative distance and the relative speed of the approaching vehicle. This indication is reliable in the case of flat, straight roads, such as motorways or the like.

If the left turn detector is activated the requirements for the alarm to be activated are stricter: First the images are filtered using the optical flow detector, in order to reduce the noise, and the two projections (along the vertical axis and along the horizontal axis) are taken into consideration. Only if a visual effect is moving forward both on the X axis and the Y axis is the alarm signal activated. This is done this way, since during the turns the visual elements are characterized by having a positive speed according to the X axis, but with an approximately null speed according to the Y axis, the height thereof is maintained. Additionally the position of the mask is lowered and moves to the right to cover the region of interest (the overtaking lane) of the images.

Then, the logic circuit, depending on the information obtained (vehicle presence, distance of the vehicle, and relative speed) activates, for example, a group of three different colored LEDs (red, amber, green) (not shown in the Figures), allowing it to communicate different warning levels, depending on the danger. A plurality of ways of presenting the warning levels is possible: from a single red luminous signal that is activated to indicate the presence of a object in the detection area, through to complex devices, with diverse luminous, acoustic and tactile signals.

The detection device has a range of more than 20 m. Thus, in the situation previously indicated by way of example, in which a vehicle wants to enter a motorway, a case in which there may be relative speeds of the order of 120 km/h, the driver receives the warning signal with almost 1 s of time.

Where the detection device is mounted simultaneously on two external rear-view mirrors (one in each side of the vehicle), it is possible to add thereto, additionally, a driver drowsiness detection device. Preferably the drowsiness detection device shares all the physical elements of the object presence detection device that participate in the capture and processing of images, such as the receiver, the electronic circuit and the logic circuit. Additionally the drowsiness detection device has an algorithm that allows drowsiness to be detected in the way described herebelow.

By means of the images obtained through each of the object presence detection devices disposed in each of the rear-view mirrors, the marking lines of the lane in which the vehicle fitted with the detection device is driving are detected. Thus it is possible to detect when the vehicle fitted with the device crosses one of said marking lines. Indeed, as a consequence of drowsiness, the driver is no longer able to follow the lane, marked by the marking lines, and leaves it, creating a situation of danger. The drowsiness detector is capable, therefore, of detecting this circumstance and of emitting an alarm signal.

To recognize said marking lines, the drowsiness detection device analyzes the image in the region immediately behind the car, it extracts the edges of the marking lines (the arrises thereof) and follows them in time. The distance between the wheel and the edge of the marking line can be detected and it is thus possible to emit an alarm signal when the vehicle is about to cross over said line. Preferably the drowsiness detection device is connected to the turn detection module, allowing it to identify the case in which the marking line is approached, because the vehicle is negotiating a curve. Also the drowsiness detection device receives information on the possible activation of the indicators, allowing it to discern a voluntary crossing of the marking lines from an involuntary or, at least, unnotified crossing.

If the drowsiness detection device detects an inadvertent crossing of a marking line, it activates a warning signal. This warning signal may be tactile (for example vibrations in the steering wheel), luminous and/or acoustic.

It is also possible to make a drowsiness detection device from a single object presence detection device, disposed in a single rear-view mirror, although in this case it is likely that the benefits thereof, in the sense of the quality or relevancy of the warning signals it emits, will not be the same.

The drowsiness detection device is always directed to the rear, and covers exactly the same area of detection as the object presence detection device, since it preferably shares therewith all the physical detection and calculation elements.

What is claimed is:

1. A method of object presence detection, by using a detection device of the type mounted to a motor vehicle, said vehicle having at least one blind spot, where said detection device is for detecting an object such as an approaching vehicle situated in said blind spot, comprising:

(a) a receiver (7) for detecting electromagnetic waves, said receiver (7) comprising a focusing device, and a light detector including a set of active photosensor elements that converts said electromagnetic waves into electrical signals, said light detector defining an image surface, (b) an electronic circuit (9) converting said electrical signals into digitized signals, (c) a logic circuit (15) analyzing said digitized signals to analyze the presence of objects in said at least one blind spot which are moving relative to said vehicle, and generating variable output alarm signals depending on the result of said analysis, and (d) indicator members activated by said output signals, said detection device being adapted to distinguish a vehicle from other objects, wherein said distinguishing is effected by recognizing arrises, clearly marked on at least a first portion of said image surface of interest in vertical and/or horizontal directions on a road surface and the follow-up of the movement of said arrises through various successive images to calculate a relative speed of a detected object providing said arrises.

2. A method, according to claim 1, wherein on a second portion of said image surface a different technique is used based on a phase difference to obtain an estimate of an optical flow in one direction.

3. A method according to claim 1, wherein said recognition of arrises is performed by said logic circuit (15) carrying out a mathematical convolution over at least said first portion of said image surface of the digitised signal thereafter distinguishing a vehicle from other objects.

4. A method according to claim 3, wherein said mathematical convolution over at least said first portion of said image surface is carried out by means of a convolution kernel appropriate for a movement detection.

5. A method according to claim 3, wherein said convolution is calculated in time no greater than 100 ms.

6. A method, according to claim 1, wherein:

said portion of the image of interest is defined by a mask controlled by software and in that an algorithm calculates the arrises of the image and their directions, said vertical and horizontal arrises being normalized and integrated along the vertical and horizontal axes respectively;

a normalization factor is adjusted dynamically based on average density of said arrises, using unidirectional projection of said arrises on corresponding coordinates axis to trace a trajectory according to said axis so that approaching objects generate projections points with positive speeds, and said projection points are separated from other points that are stationary or have relative movements with the aid of directions filters finally identifying and selecting the resulting trajectories.

7. A method according to claim 6, wherein:
once the trajectory of an approaching vehicle has been identified by means of the displacement of its corresponding unidirectional projections a speed of said vehicle is estimated and supervised so that it is possible to detect situations in which this approaching vehicle reduces speed and circulates at same speed as said vehicle fitted with said device, staying at a short distance or vehicles circulating in different lanes at practically a same speed, and
a specific type of alarm signal is emitted until substantial changes are observed in an environment of said image of an approaching vehicle.

8. A method according to claim 6 wherein:
said mark controlled from a software that defines said image surface of interest is positioned in such a way that a car located in the overtaking lane of a straight road and at a great distance is located in the left upper end of the mask, and the position of the mask with regard to the image can be adjusted to get a fine adjustment of the field of vision.

9. A method according to claim 2, wherein in order to estimate an optical flow in said one direction of an axis of a road a pair of successive images is processed and visual elements that are not moving forward are filtered and eliminated and in that said procedure is optional and may not be used.

10. A method according to claim 7 wherein in case of a left turn of the motor vehicle constant displacement of visual elements contained in different images are detected in an upper portion of successive images by means of a correlations technique and coherence of said signal during a number of successive images is used as an indication that a vehicle fitted with the device is turning so that as the detection field moves to a position closer to said vehicle more restrictive requirements are imposed before activating said alarm signals.

11. A method according to claim 7 and further additionally detecting whether said vehicle fitted with said device has initiated actions meaning an approach to said object.

12. A method according to claim 11 wherein said indicative actions comprise the activation of an indicator.

13. A method according to claim 1 wherein said indicative actions comprise turning a steering wheel.

14. A method according to claim 1 wherein said alarm signals include luminous signals of at least two colours, where each colour indicates a different warming level.

15. A method according to claim 1 wherein it further includes means for detecting drowsiness of the driver using said detection device and emitting an alarm signal depending on the relative position of the vehicle fitted with the detection device to the lines marking the lanes on the road surface.

16. A method according to claim 1, wherein said set of photosensor elements are integrated in a digital camera mounted in a rearview mirror of a vehicle and in that said camera is positioned in such a way that:
a left vertical edge of said image surface is close to a side edge of a vehicle fitted with said device;
an upper edge of said image surface is lightly above the horizon line, by approximately one eighth of the image,
said camera is slightly tilted in the clockwise direction so that it aligns said image surface along an axis of a road.

17. An object presence detection device to put into practice a method according to claim 1, said detection device being of the type mounted to a motor vehicle, said vehicle having at least one blind spot, where said detection device is for detecting an object such an approaching vehicle situated in said blind spot and comprising:
(a) a receiver (7) for detecting electromagnetic waves, said receiver (7) comprising a focusing device, and a light detector including a set of active photosensor elements that converts said electromagnetic waves into electrical signals, said light detector defining an image surface,
(b) an electronic circuit (9) converting said electrical signals into digitized signals,
(c) a logic circuit (15) analyzing said digitized signals to analyze the presence of objects in said at least one blind spot which are moving relative to said vehicle, and generating variable output alarm signals depending on the result of said analysis, and
(d) indicator members activated by said output signals, said detection device being adapted to distinguish a vehicle from other objects, wherein said active photosensor elements are integrated in a digital camera, and said digital camera is positioned in such a way that:
a left vertical edge of said image surface is close to a side edge of a vehicle fitted with said device;
an upper edge of said image surface is slightly above the horizon line, by approximately one eighth of the image,
said camera is slightly tilted in the clockwise direction so that it aligns said image surface along an axis of a road.

18. A detection device as claimed in claim 17, wherein said digital camera is housed in a vehicle external rear-view mirror unit.

19. A detection device according to claim 18, including a digital camera in each of said external rear-view mirrors of said vehicle.

20. A detection device as claimed in claim 18, wherein, a radius of action of said detection device is greater than 15 m.

21. A detection device, according to claim 20 wherein said detection device has a radius of action greater than 20 m.

22. A detection device, according to claim 17, wherein said electronic circuit (9) is of a CMOS, DMOS, MOS, Si-Ge or BiCMOS technology.

23. A detection device according to claim 17, wherein said light detector is CMOS, DMOS, MOS, Si-Ge or BiCMOS technology.

24. A detection device according to claim 17, wherein said electronic circuit (9) is SOI (silicon on insulator) technology.

25. A detection device according to claim 17, wherein said light detector is SOI (silicon on insulator) technology.

26. A detection device according to claim 17, wherein it comprises a mask controlled by software which allows to perform a partial selection of said active sensor elements so that said electronic circuit converts into digitised signals only electrical signals from said partial selected active photosensor elements.

27. A detection device according to claim 26 wherein:
said light detector is constituted by active sensor elements having a dynamic range equal or superior to six decades, i.e. between a minimum detection threshold value and a saturation threshold there is a range of six decades, with the light intensity being expressed in lux, on one same image surface; and
one said sensor element has a dynamic range equal or superior to the six decades, as defined above, between two consecutive images.

28. A detection device according to claim 27, wherein aid light detector comprises a two dimensional matrix of said sensor elements defining a number of rows of sensor elements, where each of said rows extends in a first direction and is parallel to the remaining rows, and where the group of rows forms said image surface, and each of said rows is provided with at the most 320 active sensor elements for processing the image and said light detector includes at the most 256 active rows of sensor elements for processing for processing the image.

29. A detection device according to claim 26 wherein said logic circuit (15) comprises a specialized electronic circuit including (a) a Von Neumann type sequential central processing unit (CPU), (b) a parallel coprocessor (TOT), specialized in the calculation of a convolution over at least a portion of said image surface of the digitised signal, said coprocessor including at least 32 partial accumulator multipliers with a high calculation speed for calculating said convolution directly on the image surface at such a calculation speed that the convolution is completed before a new image acquisition is initiated, and (c) a local RAM (SRAM).

* * * * *

UNITED STATES PATENT AND TRADEMARK OFFICE
CERTIFICATE OF CORRECTION

PATENT NO. : 6,911,642 B2
DATED : June 28, 2005
INVENTOR(S) : Sartori et al.

Page 1 of 1

It is certified that error appears in the above-identified patent and that said Letters Patent is hereby corrected as shown below:

Column 10,
Line 47, delete "cut" and insert -- out --.
Line 49, after "in" insert -- a --.

Column 11,
Line 15, delete "mark" and insert -- mask --.
Line 44, delete "claim 1" and insert -- claim 11 --.
Line 47, delete "warming" and insert -- warning --.

Column 12,
Line 66, delete "aid" and insert -- said --.

Column 13,
Line 6, after "image" insert -- , --.
Line 7, delete "for processing".

Column 14,
Line 5, delete "partial" and insert -- parallel --.

Signed and Sealed this

Twenty-second Day of November, 2005

JON W. DUDAS
*Director of the United States Patent and Trademark Office*